US012775881B2

(12) United States Patent
Klochkov et al.

(10) Patent No.: US 12,775,881 B2
(45) Date of Patent: Oct. 27, 2026

(54) BALANCING CLASSIFICATION ACCURACY AND FAIRNESS OF CLASSIFIER MODELS

(71) Applicant: Lemon Inc., Grand Cayman (KY)

(72) Inventors: Yegor Klochkov, London (GB); Wenlong Chen, London (GB); Yang Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 474 days.

(21) Appl. No.: 18/396,627

(22) Filed: Dec. 26, 2023

(65) Prior Publication Data

US 2025/0111263 A1 Apr. 3, 2025

Related U.S. Application Data

(60) Provisional application No. 63/540,950, filed on Sep. 28, 2023.

(51) Int. Cl.
*G06N 20/00* (2019.01)

(52) U.S. Cl.
CPC .................................... *G06N 20/00* (2019.01)

(58) Field of Classification Search
CPC ................................. G06N 20/00; G06N 7/01
See application file for complete search history.

(56) References Cited

U.S. PATENT DOCUMENTS 7,773,121 B1 * 8/2010 Huntsberger .......... H04N 23/51 348/374
9,786,077 B2 * 10/2017 Adsumilli ............... G06T 11/60
10,063,792 B1 * 8/2018 Brailovskiy ......... H04N 23/698
10,282,814 B2 * 5/2019 Lin ......................... G06T 3/067
10,368,067 B2 * 7/2019 Lin ....................... H04N 19/172
10,375,371 B2 * 8/2019 Xu .......................... G06T 3/053
10,432,856 B2 * 10/2019 Chang ................... G06T 3/4038
10,484,621 B2 * 11/2019 Adsumilli .............. H04N 19/85
10,547,879 B2 * 1/2020 Lai ................... H04N 21/23439
10,582,211 B2 * 3/2020 Sclar .................... G06V 10/764

(Continued)

OTHER PUBLICATIONS

Menon et al.; "The cost of fairness in binary classification"; Proceedings of the 1st Conf. on Fairness, Accountability and Transparency; vol. 81; 2018; p. 107-118.

(Continued)

*Primary Examiner* — Frank F Huang
(74) *Attorney, Agent, or Firm* — BakerHostetler

(57) ABSTRACT

The present disclosure describes techniques for balancing classification accuracy and fairness of a model trained to perform classification tasks. At least one bias score function corresponding to each sensitive attribute associated with instances classified by the model is configured. The at least one bias score function is configured to measure fairness on an instance level. At least one modification rule is generated based on the at least one bias score function and parameters. The at least one modification rule corresponds to at least one fairness criterion. The parameters are associated with a target level of the at least one fairness criterion. At least a subset of predictions are modified by applying the at least one modification rule to the predictions generated by the model. The modified predictions satisfy the target level of the at least one fairness criterion while maintaining the classification accuracy.

20 Claims, 12 Drawing Sheets

(56) References Cited

U.S. PATENT DOCUMENTS

| | | | | | |
|---|---|---|---|---|---|
| 12,439,029 | B2 * | 10/2025 | Kang | H04N 19/105 | |
| 12,651,173 | B2 * | 6/2026 | Derzsy | G06N 5/022 | |
| 2006/0055710 | A1 * | 3/2006 | Lo | G09G 5/14 | 345/629 |
| 2007/0014347 | A1 * | 1/2007 | Prechtl | G03B 35/08 | 348/E13.071 |
| 2008/0008458 | A1 * | 1/2008 | Gudipaty | H04N 7/147 | 348/E7.083 |
| 2009/0003714 | A1 * | 1/2009 | Subramaniam | H04N 19/184 | 375/E7.184 |
| 2010/0001997 | A1 * | 1/2010 | Kajikawa | G06T 17/20 | 345/419 |
| 2013/0071012 | A1 * | 3/2013 | Leichsenring | G06T 19/00 | 382/154 |
| 2013/0106855 | A1 * | 5/2013 | Urbach | G06T 15/08 | 345/424 |
| 2014/0104376 | A1 * | 4/2014 | Chen | G08B 13/19689 | 348/36 |
| 2014/0300693 | A1 * | 10/2014 | Hirata | G03B 37/02 | 348/39 |
| 2015/0341552 | A1 * | 11/2015 | Chen | G06T 15/00 | 348/38 |
| 2016/0314610 | A1 * | 10/2016 | Lee | G06T 15/06 | |
| 2016/0337706 | A1 * | 11/2016 | Hwang | H04N 21/23614 | |
| 2017/0195615 | A1 * | 7/2017 | Han | G09G 5/14 | |
| 2017/0295356 | A1 * | 10/2017 | Abbas | H04N 13/243 | |
| 2017/0347084 | A1 * | 11/2017 | Boyce | H04N 13/117 | |
| 2018/0075635 | A1 * | 3/2018 | Choi | G06T 11/60 | |
| 2018/0077451 | A1 * | 3/2018 | Yip | H04N 13/194 | |
| 2018/0103199 | A1 * | 4/2018 | Hendry | H04N 21/440227 | |
| 2018/0213202 | A1 * | 7/2018 | Kopeinigg | H04N 19/167 | |
| 2018/0376125 | A1 * | 12/2018 | Wang | H04N 19/00 | |
| 2019/0045222 | A1 * | 2/2019 | Yip | H04N 19/31 | |
| 2019/0238888 | A1 * | 8/2019 | Kim | G06T 3/16 | |
| 2019/0260930 | A1 * | 8/2019 | Van Hoff | G06T 3/4038 | |
| 2019/0297132 | A1 * | 9/2019 | Wang | H04L 65/752 | |
| 2020/0099953 | A1 * | 3/2020 | Xu | H04N 19/593 | |
| 2021/0037237 | A1 * | 2/2021 | Hsiang | H04N 19/70 | |
| 2022/0350810 | A1 * | 11/2022 | Majumdar | G06N 20/00 | |
| 2023/0022673 | A1 * | 1/2023 | Derzsy | G06N 5/022 | |
| 2023/0291926 | A1 * | 9/2023 | Kang | H04N 19/105 | |
| 2023/0393960 | A1 * | 12/2023 | Yadagiri | G06F 11/3452 | |

OTHER PUBLICATIONS

Chouldechova; "Fair Prediction with Disparate Impact: A Study of Bias in Recidivism Prediction Instruments"; Big Data; vol. 5; 2017; 17 pages.

Hardt et al.; "Equality of Opportunity in Supervised Learning"; 30th Conf. on Neural Information Processing Systems; 2016; 9 pages.

Zafar et al.; "Fairness Constraints: Mechanisms for Fair Classification"; 20th Int'l Conf. on Artificial Intelligence and Statistics; vol. 54; 2017; p. 962-970.

Zafar et al.; "Fairness Constraints: A Flexible Approach for Fair Classification"; Journal of Machine Learning; vol. 20; 2019; 42 pages.

Jiang et al.; "Wasserstein Fair Classification"; The 35th Uncertainty in Artificial Intelligence Conf.; vol. 115; 2020; p. 862-872.

Jiang et al.; "Group-Aware Threshold Adaptation for Fair Classification"; AAAI Conf. on Artificial Intelligence; vol. 36; 2022; p. 6988-6995.

Agarwal et al.; "A Reductions Approach to Fair Classification"; 35th Int'l Conf. on Machine Learning; vol. 80; 2018; p. 60-69.

Angwin et al.; "Machine Bias: There's software used across the country to predict future criminals. And it's biased against blacks"; https://www.propublica.org/article/machine-bias-risk-assessments-in-criminal-sentencing; May 2016; accessed Apr. 17, 2024; 28 pages.

Bhattacharya et al.; "Are University Admissions Academically Fair?"; Review of Economics and Statistics; vol. 99; 2017; p. 449-464 (Abstract Only).

Boucheron et al.; "Theory of Classification: a Survey of Some Recent Advances"; ESAIM: Probability and Statistics; vol. 9; Nov. 2005; p. 323-375.

Bosquet et al.; "Stability and Generalization"; Journal of Machine Learning Research; vol. 2; 2002; p. 499-526.

Canton et al.; "Fairness in Machine Learning: A Survey"; ACM Computing Survey; arXiv:2010.04053; Oct. 2020; 33 pages.

Chouldechova; "Fair Prediction with Disparate Impact: A Study of Bias in Recidivism Prediction Instruments"; Big Data; vol. 5 No. 2; Feb. 2017; 17 pages.

Cotter et al.; "Optimization with Non-Differentiable Constraints with Applications to Fairness, Recall, Churn, and Other Goals"; Journal of Machine Learning Research; vol. 20; 2019; 59 pages.

Donini et al.; "Empirical Risk Minimization Under Fairness Constraints"; 32nd Conf. on Neural Information Processing Systems; 2018; 11 pages.

Hardt et al.; "Train faster, generalize better: Stability of stochastic gradient descent"; 33rd Int'l Conf. on Machine Learning; vol. 48; 2016; p. 1225-1234.

He et al.; "Deep Residual Learning for Image Recognition"; IEEE Conf. on Computer Vision and Pattern Recognition; 2016; 770-778.

Jang et al.; "Group-Aware Threshold Adaptation for Fair Classification"; 36th AAAI Conf. on Artificial Intelligence; 2022; p. 6988-6995.

Klochkov et al.; "Stability and Deviation Optimal Risk Bounds with Convergence Rate O(1/n)"; 356th Conf. on Neural Information Processing Systems; 2021; 12 pages.

Kohavi; "Scaling Up the Accuracy of Naïve-Bayes Classifiers: a Decision-Tree Hybrid"; Knowledge Discovery and Data Mining; 1996; 6 pages.

Liu et al.; "Deep Learning Face Attributes in the Wild"; IEEE Int'l Conf. on Computer Vision; 2015; p. 3730-3738.

Lundberg et al.; "A Unified Approach to Interpreting Model Predictions"; 31st Conf. on Neural Information Processing Systems; 2017; 10 pages.

Mammen et al.; "Smooth discrimination analysis"; The Annal Statistics; vol. 27 No. 6; 1999; p. 1808-1829.

Park et al.; "Fair Contrastive Learning for Facial Attribute Classification"; IEEE/CVF Conf. on Computer Vision and Pattern Recognition; 2022; p. 10389-10398.

Radford et al.; "Learning Transferable Visual Models From Natural Language Supervision"; 38th Int'l Conf. on Machine Learning; vol. 139; 2021; p. 8748-8763.

Ramaswamy et al.; "Fair Attribute Classification Through Latent Space De-Biasing"; IEEE/CVF Conf. on Computer Vision and Pattern Recognition; 2021; p. 9301-9310.

Rezaie et al.; "Robust Fairness Under Covariate Shift"; 35th AAAI Conf. on Artificial Intelligence; vol. 35; 2021; p. 9419-9427.

Wang et al.; "Fair Classification with Group-Dependent Label Noise"; ACM Conf. on Fairness, Accountability and Transparency; 2021; p. 526-536.

Wang et al.; "Understanding Instance-Level Impact of Fairness Constraints"; 39th Int'l Conf. on Machine Learning; vol. 162; 2022; p. 23114-23130.

Yao et al.; "On the Cause of Unfairness: A Training Sample Perspective"; arXiv:2306.17828; Feb. 2024; 28 pages.

Zhu et al.; "Weak Proxies are Sufficient and Preferable for Fairness with Missing Sensitive Attributes"; 40th Int'l Conf. on Machine Learning; vol. 202; 2023; p. 43258-43288.

* cited by examiner

200

Algorithm 1 Algorithm for DP

Input: $\delta$: desired constraint for DP,
$\{(X_i, Y_i, A_i)\}_{i=1}^{N_{val}}$: validation set,
$\hat{p}(Y|X)$, $\hat{p}(A|X)$,
evaluated $\widehat{\Pr}(A=0)$, $\widehat{\Pr}(A=1)$

Output: Threshold $t^*$ for modification rule $\kappa(X) = \mathbf{1}\{\hat{s}(X) > t^*\}$;

Compute $\{\hat{Y}_i = \mathbf{1}\{\hat{p}(Y=1|X_i) > 0.5\}\}_{i=1}^{N_{val}}$
$\mathrm{acc} = \widehat{Acc}(\hat{Y})$
$\mathtt{counts}[a]$ = calculate frequency of $\hat{Y} = 1$ in two groups $A = 0, 1$
Compute $\{\hat{s}(X_i)\}_{i=1}^{N_{val}}$ based on $\hat{p}(Y|X)$, $\hat{p}(A|X)$, and $\widehat{Pr}(A)$
Compute argsort $IDX = [i_1, \ldots, i_{N_{val}}]$ in ascending order, such that $\hat{s}(X_{i_j}) \geq \hat{s}(X_{i_{j+1}})$
Best accuracy $ACC_{\max} = 0$
for $j$ in $IDX$ do
set candidate $t = \hat{s}(X_j)$
$\mathrm{acc} = \mathrm{acc} + N_{val}^{-1}(1 - 2\mathbf{1}\{\hat{Y}_j = Y_j\})$ ▷ Update accuracy
$\mathtt{counts}[A_j] = \mathtt{counts}[A_j] + N_{val}^{-1}(1 - 2\hat{Y}_j)$ ▷ Update counts for group $A = A_j$
$\mathrm{dp} = \left|\mathtt{counts}[0]/\widehat{\Pr}(A=0) - \mathtt{counts}[1]/\widehat{\Pr}(A=1)\right|$
if dp $\leq \delta$ and acc $> ACC_{\max}$ then
$t^* = t$ ▷ Update best candidate
$ACC_{\max} = \mathrm{acc}$
end if
end for
return $t^*$

FIG. 2

300

Algorithm 2 Algorithm for EO

Input: $\delta$: desired constraint for EO.
$M$: the number of random samples from the validation set
$\{(X_i, Y_i, A_i)\}_{i=1}^{N_{val}}$: validation set.
$p(Y|X)$, $\hat{p}(Y, A|X)$,
evaluated $\widehat{\Pr}(Y = y, A = a), a, y \in \{0, 1\}$

Output: Linear modification rule $\kappa(X)$

Compute $\{\hat{Y}_i = \mathbf{1}\{\hat{p}(Y = 1|X_i) > 0.5\}\}_{i=1}^{N_{val}}$
Compute $\{[\hat{s}_0(X_i), \hat{s}_1(X_i)]^\top\}_{i=1}^{N_{val}}$ based on $p(Y|X)$, $\hat{p}(Y, A|X)$ and $\widehat{\Pr}(Y, A)$
Randomly sample $M$ instances from the validation set: $\{(X'_m, Y'_m)\}_{m=1}^{M}$
Construct the set of linear rules to search with index: ▷ size: $\frac{M(M-1)}{2}$ $$\mathcal{S}_M = \{(k,l) | k < l, \; k, l = 1, \ldots, M\}$$

Best accuracy $ACC_{\max} = 0$
for $(k, l)$ in $\mathcal{S}_M$ do
  $\kappa^{(k,l)}(X) = \mathbf{1}\left\{\frac{\hat{s}_1(X) - \hat{s}_1(X'_k)}{\hat{s}_1(X'_k) - \hat{s}_1(X'_l)} > \frac{\hat{s}_0(X) - \hat{s}_0(X'_k)}{\hat{s}_0(X'_k) - \hat{s}_0(X'_l)}\right\}$
  for $i = 1, \cdots, N_{val}$ do
    if $\kappa^{(k,l)}(X_i) = 1$ then
      $\tilde{Y}_i = 1 - \hat{Y}_i$ ▷ Modify when $\kappa^{(k,l)}(X_i) = 1$
    else
      $\tilde{Y}_i = \hat{Y}_i$ ▷ Do not modify when $\kappa^{(k,l)}(X_i) = 0$
    end if
  end for
  Compute validation $ACC(\kappa^{(k,l)})$ and $EO(\kappa^{(k,l)})$ based on $\tilde{Y}$
  if $EO(\kappa^{(k,l)}) \leq \delta$ and $ACC(\kappa^{(k,l)}) > ACC_{max}$ then
    $\kappa(X) = \kappa^{(k,l)}(X)$, $ACC_{max} = ACC(\kappa^{(k,l)})$
  end if
end for
return $\kappa(X)$

FIG. 3

400

Algorithm 3 Alternative algorithm for EO

Input: $\delta$: desired constraint for EO,
$\{(X_i, Y_i, A_i)\}_{i=1}^{N_{val}}$: validation set,
$\hat{p}(Y|X)$, $\hat{p}(Y, A|X)$,
evaluated $\widehat{\Pr}(Y = y, A = a), a, y \in \{0, 1\}$

Output: Threshold $t^*$ and direction $(w_0^*, w_1^*)$ for modification rule $\kappa(X) = \mathbb{1}\{w_0^* \hat{s}_0(X) + w_1^* \hat{s}_1(X) > t^*\}$;

Compute $\{\hat{Y}_i = \mathbb{1}\{\hat{p}(Y = 1|X_i) > 0.5\}\}_{i=1}^{N_{val}}$
counts$[y, a]$ = calculate frequency of $\hat{Y} = 1$ in all four groups $(Y, A) = (y, a)$
Compute $\{(\hat{s}_0(X_i), \hat{s}_1(X_i))\}_{i=1}^{N_{val}}$ based on $\hat{p}(Y|X)$, $\hat{p}(Y, A|X)$, and $\widehat{\Pr}(Y, A)$
Fix set of directions $W_K = \{(w_0^{(k)}, w_1^{(k)})\}_{k=1}^{K} \subset \mathbb{R}^2$, $\|(w_0^{(k)}, w_1^{(k)})\|_2 = 1$
Best accuracy $ACC_{\max} = 0$
for $(w_0, w_1)$ in $W_K$ do
    acc = $\widehat{Acc}(\hat{Y})$
    Compute scalar scores $\hat{s}(X_i) = w_0 \hat{s}_0(X_i) + w_1 \hat{s}_1(X_i)$
    Compute argsort $IDX = \{i_1, \ldots, i_{N_{val}}\}$ in ascending order, such that $\hat{s}(X_{i_j}) \geq \hat{s}(X_{i_{j+1}})$
    for $j$ in $IDX$ do
        set candidate $t = \hat{s}(X_j)$
        acc = acc + $N_{val}^{-1}(1 - 2\mathbb{1}\{\hat{Y}_j = Y_j\})$ ▷ Update accuracy
        count$[Y_j, A_j]$ = count$[Y_j, A_j]$ + $N_{val}^{-1}(1 - 2\hat{Y}_j)$ ▷ Update counts for group $(Y_j, A_j)$
        eo0 = $\left| \text{count}[0, 0]/\widehat{\Pr}(Y = 0, A = 0) - \text{count}[0, 1]/\widehat{\Pr}(Y = 0, A = 1) \right|$
        eo1 = $\left| \text{count}[1, 0]/\widehat{\Pr}(Y = 1, A = 0) - \text{count}[1, 1]/\widehat{\Pr}(Y = 1, A = 1) \right|$
        eo = max(eo0, eo1)
        if eo $\leq \delta$ and acc $> ACC_{\max}$ then
            $ACC_{\max}$ = acc ▷ update best candidate
            $t^* = t$
            $(w_0^*, w_1^*) = (w_0, w_1)$
        end if
    end for
end for
return Modification rule $\kappa(X) = \mathbb{1}\{w_0^* \hat{s}_0(X) + w_1^* \hat{s}_1(X) > t^*\}$

FIG. 4

1100

| | (a, m) | | (a, y) | | (b, m) | |
|---|---|---|---|---|---|---|
| $\delta$ | ACC | EO | ACC | EO | ACC | EO |
| $\infty$ | 81.9 | 23.8 | 82.0 | 24.7 | 84.1 | 44.9 |
| 10 | 80.9 | 6.7 | **79.7** | **10.9** | 83.5 | 8.4 |
| 5 | **80.1** | **2.2** | 78.2 | 6.6 | **83.3** | **4.3** |
| 1 | 79.3 | 4.0 | 76.9 | 2.0 | 83.2 | 1.7 |
| Hardt et al. (2016a) | 71.7 | 3.8 | 71.4 | 3.4 | 78.2 | 0.5 |
| Park et al. (2022) | 79.1 | 6.5 | 79.1 | 12.4 | 82.9 | 5.0 |

| | (b, y) | | (e, m) | | (e, y) | |
|---|---|---|---|---|---|---|
| $\delta$ | ACC | EO | ACC | EO | ACC | EO |
| $\infty$ | 84.5 | 21.0 | 85.2 | 19.0 | 85.6 | 13.7 |
| 10 | 84.3 | 10.6 | 85.0 | 8.2 | 85.1 | 9.5 |
| 5 | **84.2** | **4.1** | 84.7 | 5.6 | 85.1 | 5.4 |
| 1 | 83.6 | 2.4 | 83.1 | 1.7 | 83.6 | 1.8 |
| Hardt et al. (2016a) | 80.1 | 1.3 | 80.2 | 1.7 | 81.7 | 1.6 |
| Park et al. (2022) | 84.1 | 4.8 | 83.4 | 3.0 | 83.5 | 1.6 |

FIG. 11

BALANCING CLASSIFICATION ACCURACY AND FAIRNESS OF CLASSIFIER MODELS

CROSS REFERENCE TO RELATED APPLICATION

This disclosure claims priority to U.S. Provisional Patent Application No. 63/540,950, filed on Sep. 28, 2023, entitled "Post-Hoc Fair Classification with Bias Scores," which is incorporated herein by reference in its entirety.

BACKGROUND

With machine learning models (e.g., classifier models) increasingly being used to perform classification tasks, it is crucial to ensure fairness in the predictions made by such classifier models. For example, their predictions should not be biased toward a specific group of the population. However, it is difficult to train classifier models that both satisfy fairness constraints and perform classification tasks with a high accuracy. Therefore, improvements in techniques for balancing the classification accuracy and fairness of classifier models are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 shows an example modification rule algorithm in accordance with the present disclosure.

FIG. 3 shows another example modification rule algorithm in accordance with the present disclosure.

FIG. 4 shows another example modification rule algorithm in accordance with the present disclosure.

FIG. 11 shows example evaluation results for experiments with equalized odds (EO) as the fairness criterion in accordance with the present disclosure.

DETAILED DESCRIPTION OF ILLUSTRATIVE EMBODIMENTS

Training classifiers that maintain competitive accuracy while satisfying fairness constraints remains a challenging problem. Existing techniques often require intervention during the training time. Existing techniques also often require knowledge of sensitive attributes during inference time. This is impractical for real-world applications where sensitive attributes during inference are inaccessible due to privacy protection. As such, improved techniques for maintaining competitive accuracy while satisfying fairness constraints are needed.

Described herein are improved techniques for maintaining competitive accuracy while satisfying fairness constraints. Given a ground truth distribution $p(Y, A|X)$, the Bayes-optimal classifier satisfying fairness constraint may be derived for various general group-fairness metrics, including Demographic Parity (DP), and Equalized Opportunity (EOp), and Equalized Odds (EO). The techniques described herein facilitate the use of composite fairness criteria that involve more than one sensitive attributes at the same time.

The techniques described herein involve a modification of an unconstrained Bayes optimal classifier based on bias scores. The bias scores can be thought of as a measure of bias on an instance level. For example, to reduce the gender gap in university admissions, such gap reduction typically happens at the expense of applicants with borderline academic abilities. In terms of classification (passed/not passed), this corresponds to the group where we are least certain in the evaluation of an applicant's academic abilities. This suggests that evaluation of bias on the instance level should not only account for prediction and group membership, but also uncertainty in the prediction of target value. The bias scores described herein not only conform with this logic, but due to being part of a Bayes optimal classifier, they are also theoretically principled. In particular, for the case of DP constraints, the optimal constrained classifier can be obtained by modifying the output of the unconstrained classifier on instances with the largest bias score. When EO constraints are imposed, or more generally a composite criterion, the optimal modification is a linear rule with two or more bias scores. Based on the obtained optimal classifier, any score-based classifier may be adapted to fairness constraints.

Figure 1:
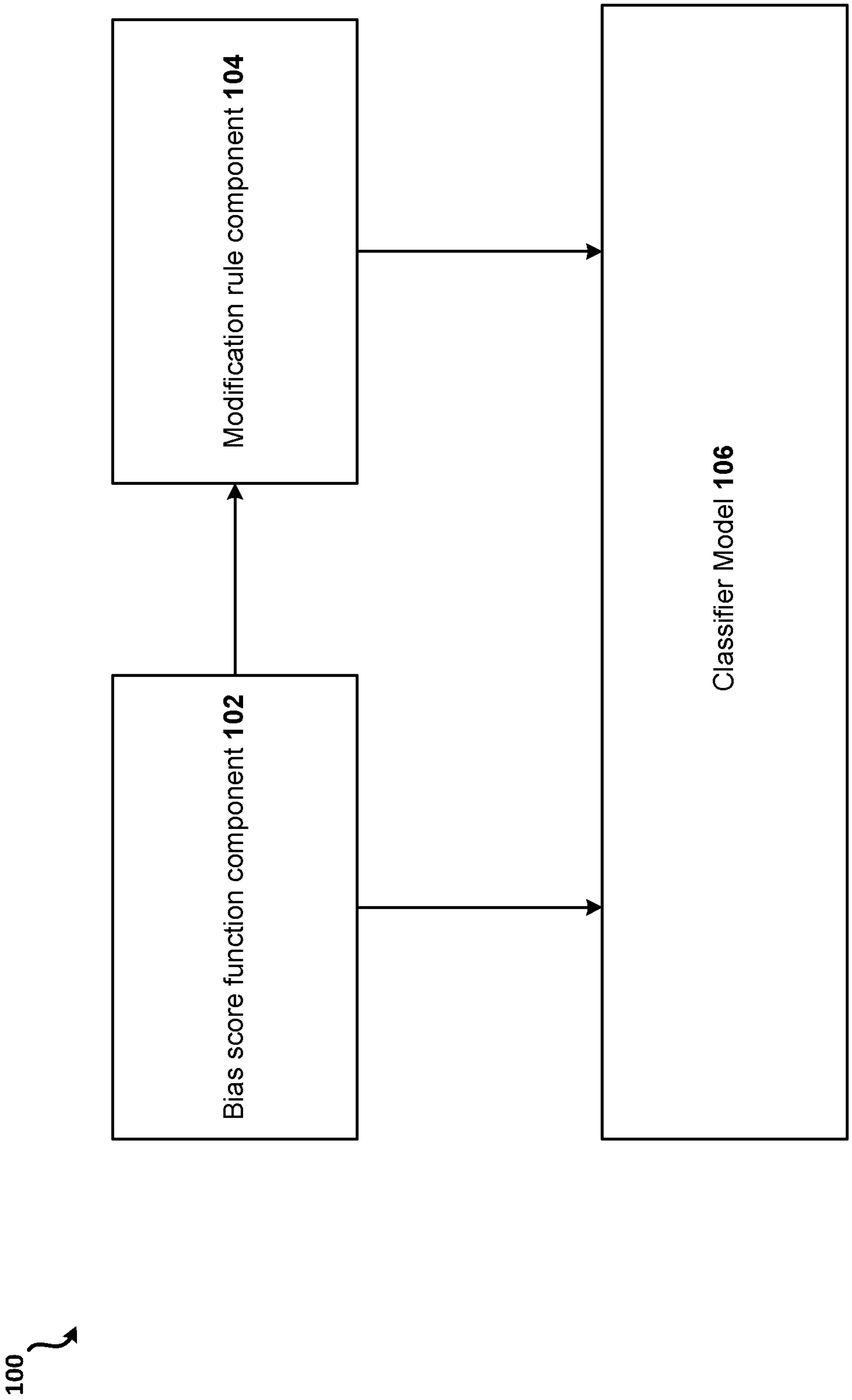
FIG. 1 shows an example system for balancing classification accuracy and fairness of a model trained to perform classification tasks in accordance with the present disclosure.

FIG. 1 shows an example system 100 for balancing classification accuracy and fairness of a model 106 trained to perform classification tasks in accordance with the present disclosure. The system 100 may be utilized to perform a post-processing method that can flexibly adjust the trade-off between accuracy and fairness and does not require access to sensitive attributes. The system 100 may comprise the model 106, a bias score function component 102, and a modification rule component 104.

The bias score function component 102 may comprise at least one bias score function. The at least one bias score function may be configured for each sensitive attribute associated with instances classified by the classifier model 106. The at least one bias score function may be configured to measure fairness on an instance level. The at least one bias score function may be configured based on predictions of an auxiliary model that is trained to predict conditional distributions related to sensitive attributes. The at least one bias score function enables the model 106 to bypass access to sensitive attributes during inference.

The modification rule component 104 may comprise at least one modification rule. The at least one modification rule may correspond to at least one fairness criterion (e.g., DP, EOp, or EO). The at least one modification rule may be generated based on the at least one bias score function and parameters. The parameters may be associated with a target (e.g., desired) level of the at least one fairness criterion. The at least one modification rule may be used to modify at least a subset of predictions generated by the model 106. For example, at least a subset of predictions may be modified by applying the at least one modification rule to the predictions generated by the model 106. The modified predictions may satisfy the target (e.g., desired) level of the at least one fairness criterion while maintaining the classification accuracy. A trade-off between the classification accuracy and the fairness may be adjusted by adjusting the at least one modification rule.

The model 106 may be a classifier model (e.g., Bayes optimal unconstrained classifier) $\hat{Y}$, where $\hat{Y}=\hat{Y}(X)$ for a target variable $Y \in \{0,1\}$ based on an input X. Apart from the accuracy of the model 106, the system 100 is concerned with fairness measurement, given that there is a sensitive attribute A, with some underlying population distribution over the triplets $(X, Y, A) \sim Pr$ in mind. It may be assumed that the sensitive attribute is binary as well. For a given distribution over $Pr \sim (X, Y)$, the model 106 may have the form $\hat{Y}(X)=1\{p(Y=1|X)>0.5\}$ in the sense that it achieves maximum accuracy. Although it is not generally possible to know these ground-truth conditional probabilities $(p(Y=1|X))$ in practice, such characterization allows one to train probabilistic classifiers, typically with cross-entropy loss. It may be determined which classifier $\check{Y}(X)$ maximizes the accuracy $Acc(\check{Y})=Pr(\check{Y}=Y)$ under the restriction that a particular group fairness measure is below a given level $\delta>0$.

The system 100 is compatible with at least the DP, EOp, and EO group-fairness criteria. DP is concerned with equalizing the probability of a positive classifier output in each sensitive group:

$$DP(\hat{Y}, A) = \left|Pr(\hat{Y}=1 \mid A=0) - Pr(\hat{Y}=1 \mid A=1)\right| \quad \text{Equation 1}$$

Unlike DP that suffers from explicit trade-off between fairness and accuracy in the case where Y and A are correlated, EO is concerned with equalizing false-positive and true positive rates in sensitive groups:

$$EO(\hat{Y}, A) = \max_{y=0,1}\left|Pr(\hat{Y}=1 \mid A=0, Y=y) - Pr(\hat{Y}=1 \mid A=1, Y=y)\right| \quad \text{Equation 2}$$

EOp measures the disparity conditional on positive ground truth labels:

$$EOp(\hat{Y}, A) = \left|Pr(\hat{Y}=1 \mid A=0, Y=1) - Pr(\hat{Y}=1 \mid A=1, Y=1)\right| \quad \text{Equation 3}$$

In embodiments, several sensitive attributes $A_1, \ldots, A_K$ may exist. For each of the sensitive attributes, values $a_k$, $b_k$ may be fixed. The groups $\{A_k=a_k\}$ and $\{A_k=b_k\}$ may need to be equalized. For example, the goal may be to minimize a composite criterion represented by a maximum over a set of disparities:

$$CC(\check{Y}) = \max_{j=1,\ldots K}\left|Pr(\check{Y}=1 \mid A_k=a_k) - PR(\check{Y}=1 \mid A_k=b_k)\right| \quad \text{Equation 4}$$

This general case covers DP, EOp, and EO, as well as composite criteria involving more than one sensitive attribute.

For DP, utilizing Equation 1, it is straightforward: take $A_1=A \in \{0, 1\}$, $a_1=0$, $b_1=1$, and then with K=1, $CC(\check{Y})=DP(\check{Y})$. For EOp, if a sensitive attribute $A \in \{0, 1\}$ exists, then the EOp criterion (e.g., Equation 2), can be written in the form of Equation 4 with $A_1=(A, Y)$, $a_1=(0, 1)$, and $b_1=(1, 1)$. For EO, it can be written as a composite criterion with K=2 by setting $A_1=A_2=(A, Y)$, and setting $a_1=(0, 0)$, $b_1=(1, 0)$, $a_2=(0, 1)$, $b_2=(1, 1)$ in Equation 4. If two and more sensitive attributes (e.g., gender and race) exist, fairness with respect two sensitive attributes A, B may be simultaneously considered. The maximal of two DPs may be maximized as follows:

$$\max\left\{\left|Pr(\hat{Y}=1 \mid A=0) - Pr(\hat{Y}=1 \mid A=1)\right|, \left|Pr(\hat{Y}=1 \mid B=0) - Pr(\hat{Y}=1 \mid B=1)\right|\right\}$$

If three DPs exist, K will equal three in Equation 4. To determine a maximum over EO's for two different sensitive attributes, K=4, etc.

Given a specified fairness level $\delta>0$, the optimal classifier $\check{Y}(X)$, possibly randomized, that is optimal under the following composite criterion constraints may be determined:

$$\max Acc(\hat{Y}) = Pr(\hat{Y}=Y) \text{ s.t. } CC(\hat{Y}) \leq \delta \quad \text{Equation 5}$$

The solution may be in the form of modification of the Bayes optimal unconstrained classifier. The notation $\hat{Y}=\hat{Y}(X)$ denotes the Bayes optimal unconstrained classifier $1\{p(1|X)>0.5\}$. The problem may be parameterized by setting $\kappa(X)=Pr(\check{Y}\neq\hat{Y}|X)$ as the target function. In other words, given an arbitrary function $\kappa(X) \in [0, 1]$, the modification $\check{Y}(X)$ of $\hat{Y}(X)$ may be defined by drawing $Z \sim Be(\kappa(X))$ and outputting:

$$\check{Y} = \begin{cases} \hat{Y}, & Z=0 \\ 1-\hat{Y}, & Z=1 \end{cases}$$

Such function $\kappa(X)$ may be referred to as a modification rule. With such reparameterization, the accuracy of a modified classifier can be rewritten as:

$$Acc(\check{Y}) = Acc(\hat{Y}) - \int \eta(X)\kappa(X)dPr(X)$$

where $\eta(X)=|2p(Y=\hat{Y}|X)-1|$ represents the confidence of the Bayes optimal unconstrained classifier Y on the instance X (see Section A.1 for detailed derivation). A similar representation holds for the value of the composite criterion. Specifically, recall the criterion is of the form $CC(\check{Y})=\max_{k\le K}|C_k(\check{Y})|$, where $$C_k(\check{Y}) = Pr(\check{Y}=1 \mid A_k=a_k) - Pr(\check{Y}=1 \mid A_k=b_k),$$

which can be rewritten as:

$$C_k(\check{Y}) = C_k(\hat{Y}) - \int f_k(X)\kappa(X)dPr(X) \qquad \text{Equation 6}$$

$$f_k(X) := (2\hat{Y}-1)\left[\frac{p(A_k=a_k \mid X)}{Pr(A_k=a_k)} - \frac{p(A_k=b_k \mid X)}{Pr(A_k=b_k)}\right]$$

These two expressions suggest that modifying the answer on a point with low confidence $\eta(X)$ makes the least losses in the accuracy, while modifying on the answers with higher absolute value of $f_k(X)$ makes largest effect on the parity values, although this has to depend on the sign. As such, the modification rule may be defined on the relative score:

$$s_k(X) = \frac{f_k(X)}{\eta(X)} \qquad \text{Equation 7}$$

which may be referred to as a bias score (e.g., instance level bias score). The optimal modification rule (e.g., the modification rule corresponding to the constrained optimal classifier in Equation 5) is a simple linear rule with respect to the given K bias scores. This is shown rigorously in the following Theorem 1:

Theorem 1. Suppose that all functions $f_k$, $\eta$ are square-integrable and the scores $s_k(X)=f_k(X)/\eta(X)$ have joint continuous distribution. Then, for any $\delta>0$, there is an optimal solution defined in Equation 5 that is obtained with a modification rule of the form $$\kappa(X) = 1\left\{\sum_k z_k s_k(X) > 1\right\} \qquad \text{Equation 8}$$

This result suggests that for the case of DP, EOp, or EO, given the ground-truth probabilities $p(Y, A|X)$, only one parameter needs to be fit for either DP or EOp, which essentially corresponds to finding a threshold, and a linear rule needs to be fit in two dimensions for EO. Below we consider each of the three fairness measures in detail.

As functions of X, the probabilities $p(Y|X)$ and $p(Y, A|X)$ must agree in order for Theorem 1 to hold, in the sense that $p(Y|X)=p(Y, 0|X)+p(Y, 1|X)$. However, the form of the algorithms itself, which only requires "plug-in" estimators $\hat{p}(Y|X)$ and $\hat{p}(Y, A|X)$ for ground truth $p(Y|X)$ and $p(Y,A|X)$ respectively, does not require strict agreement between $\hat{p}(Y|X)$ and $\hat{p}(Y, A|X)$ for it to run. In practice, $\hat{p}(Y|X)$ and $\hat{p}(Y, A|X)$ that were trained separately may be employed, and the algorithm may be run even in the case where the auxiliary model $\hat{p}(Y, A|X)$ was pretrained by a third party on another dataset similar to the one of interest.

The bias score function component 102 may configure the at least one bias score function. The at least one bias score function may correspond to each sensitive attribute associated with instances classified by the classifier model 106. The at least one bias score function may be configured to measure fairness on an instance level. For a DP constraint, the bias score function component 102 may configure a single bias score of the form:

$$s(x) = \frac{1}{\eta(X)}(2\hat{Y}-1)\left[\frac{p(A=0 \mid X)}{Pr(A=0)} - \frac{p(A=1 \mid X)}{Pr(A=1)}\right], \qquad \text{Equation 9}$$

For an EOp constraint, the bias score function component 102 may configure a single bias score of the form:

$$s(x) = \frac{1}{\eta(X)}(2\hat{Y}-1)\left[\frac{p(A=0, Y=1 \mid X)}{Pr(A=0, Y=1)} - \frac{p(A=1, Y=1 \mid X)}{Pr(A=1, Y=1)}\right]$$

For an EO constraint, the ground-truth conditional probabilities $p(Y, A|X)$ are needed, and the bias score function component 102 may configure two bias scores for k=0, 1:

$$s_k(x) = \frac{1}{\eta(X)}\{2\hat{Y}-1\}\left[\frac{p(Y=k, A=0 \mid X)}{Pr(Y=k, A=0)} - \frac{p(Y=k, A=1 \mid X)}{Pr(Y=k, A=1)}\right] \qquad \text{Equation 10}$$

The modification rule component 104 may generate at least one modification rule based on the at least one bias score function. The at least one modification rule may correspond to at least one fairness criterion (e.g., DP, EOp, or EO). The modification rule component 104 may generate at least one modification rule based on parameters. The parameters may be associated with a target (e.g., desired) level of the at least one fairness criterion.

For a DP constraint, since there is only one score, the modification rule component 104 may generate the at least one modification rule using a simple threshold rule of this bias score $\kappa(X)=1\{s(X)/t>1\}$. The threshold t can be positive or negative, depending on which group has the advantage. This allows for linear comparison of fairness on the instance level. That is, departing from a fairness measure defined on a group level, a bias score that measures fairness on each separate instance is derived. For example, in the context of university admissions, the bias score described herein conforms with the following logic: it is fairer to admit a student who has high academic performance and who comes from advantageous group (lower $\eta(X)$), than one who has borderline performance (higher $\eta(X)$) even though they are both equally likely to come from the advantageous group (same f(X)). For an EOp constraint, the at least one modification rule is also a simple threshold rule corresponding to the bias score.

For an EO constraint, the modification rule component 104 may generate the at least one modification rule by finding a linear rule in the bias embedding space $(s_o(X), s_1(X))$, which on validation, achieves the targeted equalized odds, while maximizing the accuracy. The problem is no longer a simple threshold choice as in the case of the DP-constrained classifier. A fairness constrained classifier still needs to be fit, only the complexity of the problem has been drastically reduced to dimension K=2, and only a linear classifier has to be fit.

The modification rule in the case of EO constraints can be demonstrated with the following data as an example:

$$p(X \mid Y=1, A=0) = N([2, 0], [5, 1; 1, 5]), \qquad \text{Equation 11}$$

$$p(X \mid Y=1, A=1) = N([2, 3], [5, 1; 1, 5])$$

-continued $$P(X \mid Y=0, A=0) = N([-1, -3], [5, 1; 1, 5])\ \ p(X \mid Y=0, A=1) = N([-1, 0], [5, 1; 1, 5])$$

500, 100, 100, 500 points may be sampled from each of groups (Y, A)=(1, 0), (1, 1), (0, 0), (0, 1), respectively, so that Y and A are correlated. Next, a logistic linear regression may be fit with 4 classes to estimate p(Y, A|X) and the scores may be calculated according to the formulas of Equation 10.

In practice, especially for deep learning models, unconstrained classifiers are usually of the form $\hat{Y}=1\{\hat{p}(Y|X)>0.5\}$, with the conditional probability trained using the cross-entropy loss. The characterization of the optimal modification rule described herein naturally suggests a practical post-processing algorithm that takes fairness restriction into account: given an auxiliary model for either $\hat{p}(A|X)$ (in the case of DP constraints) or $\hat{p}(Y, A|X)$ (in the case of EOp and EO constraints), these estimated conditionals may be treated as ground-truth conditional distributions, plugging them into Equation 7 to compute the bias scores. The prediction $\hat{Y}$ may be modified correspondingly with a linear rule over these bias scores.

The linear modification rule may be fit using a labelled validation set. This approach may be referred to as Modification with Bias Scores (MBS) and it does not require knowing test set sensitive attribute since the bias scores are computed based on the estimated conditional distributions related to sensitive attribute $\hat{p}(A|X)$ or $\hat{p}(Y, A|X)$ instead of the empirical observations of sensitive attribute.

The at least one modification rule may be used to modify at least a subset of predictions generated by the model 106. For example, the at least a subset of predictions generated by the model 106 may be modified by applying the at least one modification rule to the predictions. The modified predictions may satisfy the target level of the at least one fairness criterion while maintaining the classification accuracy.

In this case of DP constraints, two models $\hat{p}(Y|X)$ and $\hat{p}(A|X)$ (which in the experiments are fitted over the training set but can be provided by a third party as well) may be used to estimate the ground truth p(Y|X) and p(A|X) respectively. The bias score may be defined as follows:

$$\hat{s}(X) = \frac{\hat{f}(X)}{\hat{\eta}(X)} = \frac{\{2\hat{Y}-1\}\left[\frac{\hat{p}(A=0 \mid X)}{\widehat{\Pr}(A=0)} - \frac{\hat{p}(A=1 \mid X)}{\widehat{\Pr}(A=1)}\right]}{2\hat{p}\left(Y=\hat{Y}(X) \mid X\right)-1}$$

where $\widehat{Pr}$ (A=i) (i=0, 1) can be estimated by computing the ratio of the corresponding group in the training set. The modification rule of the form κ(X)=1 {ŝ(X)/t>1} may be searched for, so that the resulting $\check{Y}$t(X)=1 {ŝ(X)/t≤1} $\hat{Y}$(X)+1 {ŝ(X)/t>1} (1−$\hat{Y}$(X)) satisfies the DP constraint, while maximizing the accuracy. For this, a labeled validation dataset $$(X_i, Y_i, A_i)_{i=1}^{N_{val}}$$

may be used, and the threshold t may be chosen such that the validation accuracy is maximized, while the empirical DP evaluated on it is ≤δ. To find the best threshold value, all $N_{val}$ candidates $t=\hat{s}(X_i)$ may be tested, which can be done in $O(N_{val} \log N_{val})$ time. This is discussed in more detail below with regard to Algorithm 1 shown in FIG. 2.

FIG. 2 shows Algorithm 1. For the case of DP restrictions, it is assumed that models $\hat{p}(Y|X)$ and $\hat{p}(A|X)$ are given, as well as evaluated probabilities $\widehat{PR}$ (A=0), $\widehat{PR}$ (A=1), can either be evaluated on a bigger training dataset, or on the validation dataset. After the corresponding scores $\hat{s}(X_i)$ are calculated, the rearrangement $$\hat{s}(X_{i_1}) \geq \ldots \geq \hat{s}\left(X_{i_{N_{val}}}\right)$$

may be considered and the thresholds $t=\hat{s}(X_{i_j})$ may be tested one after the other. When moving to the next candidate $t=\hat{s}(X_{i_{j+1}})$, only O(1) time is necessary to update the current empirical DP and accuracy.

Referring back to FIG. 1, in the case of EO constraints, an auxiliary model $\hat{p}(Y, A|X)$ with four classes may be required. This may be used to obtain the 2D estimated bias score $(\hat{s}_0(X), \hat{s}_1(X))$, where $$\hat{s}_0(X) = \frac{\hat{f}_0(X)}{\hat{\eta}(X)} = \frac{\{2\hat{Y}(X)-1\}\left[\frac{\hat{p}(A=0, Y=0 \mid X)}{\widehat{\Pr}(A=0, Y=0)} - \frac{\hat{p}(A=1, Y=0 \mid X)}{\widehat{\Pr}(A=1\ Y=0)}\right]}{2\hat{p}\left(Y=\hat{Y}(X) \mid X\right)-1}$$

$$\hat{s}_1(X_i) = \frac{\hat{f}_1(X)}{\hat{\eta}(X_i)} = \frac{\{2\hat{Y}(X)-1\}\left[\frac{\hat{p}(A=0, Y=1 \mid X)}{\widehat{\Pr}(A=0, Y=1)} - \frac{\hat{p}(A=1, Y=1 \mid X)}{\widehat{\Pr}(A=1\ Y=1)}\right]}{2\hat{p}\left(Y=\hat{Y}(X) \mid X\right)-1}$$

where each of the $\widehat{PR}$ (A=a) (Y=y) is again estimated from training set. A linear modification rule κ(X)=1 $\{a_0\hat{s}_0(X)+a_1\hat{s}_1(X)>1\}$ that, for a given validation set, satisfies the empirical EO constraint while maximizing the validation accuracy may be searched for. Two strategies may be employed to choose such a linear rule.

In the first approach, a subsample of points $$\{(\hat{s}_0(X'_m), \hat{s}_1(X'_m))\}_{m=1}^{M}$$

of size $M \leq N_{val}$ may be taken and all M(M−1)/2 possible linear rules passing through any two of these points may be considered. For each of these rules, the EO and accuracy on validation set may be evaluated, then maximal accuracy among ones satisfying EO≤δ may be chosen. The total complexity of this procedure is $O(M^2 N_{val})$. A formal algorithm is summarized below with regard to Algorithm 2 of FIG. 3.

FIG. 3 shows Algorithm 2. For the case of EO restrictions, models $\hat{p}(Y|X)$, $\hat{p}((Y, A)|X)$, which are two functions that do not necessarily agree as probability distributions, ma be given. Evaluated probabilities $\widehat{PR}$ (Y=y, A=a), a, y∈{0, 1} may also be given. Then, the corresponding scores $\hat{s}_{0,1}(X_i)$ may be calculated. In order to choose the linear rule of the form κ(X)=1 $\{a\hat{s}_0(X)+b\hat{s}_1(X)>c\}$, the search can be restricted only to lines that pass through two validation points, which exhaust the search of all possible pairs of accuracy and EO on validation. This, however, may require $O(N^3)$ to evaluate. As such, an option with M sub-samples may be considered, where only the corresponding M(M−1)/2 lines passing through every two of them are considered.

In the second (simplified) approach for choosing a linear rule, a set of K equiangular directions w=(cos(2πj/K), sin $2\pi j/K)$) may be fixed for j=0, . . . , K=1. Then, for a score $w_0\hat{s}_0$ (X)+$w_1\hat{s}_1$(X) a threshold may be chosen. The threshold may be chosen following the same procedure as used in the DP case, where the EO and accuracy were evaluated dynamically. The time complexity may be in $O(KN_{val} \log N_{val})$. A formal algorithm is summarized below with regard to Algorithm 3 of FIG. 4.

FIG. 4 shows Algorithm 3. K possible directions $(a,b)\in R^2$ may be fixed, such that $a^2+b^2=1$, and then for each of them the score $\hat{s}(X)=a\hat{s}_0(X)+b\hat{s}_1$ (X) may be considered. Only the optimal thresholds may need to be chosen, similar to the case of DP. By doing so for each of the K directions, the best line in $O(KN_{val} \log N_{val})$ time may be approximate (which includes sorting the score values).

Figure 5:
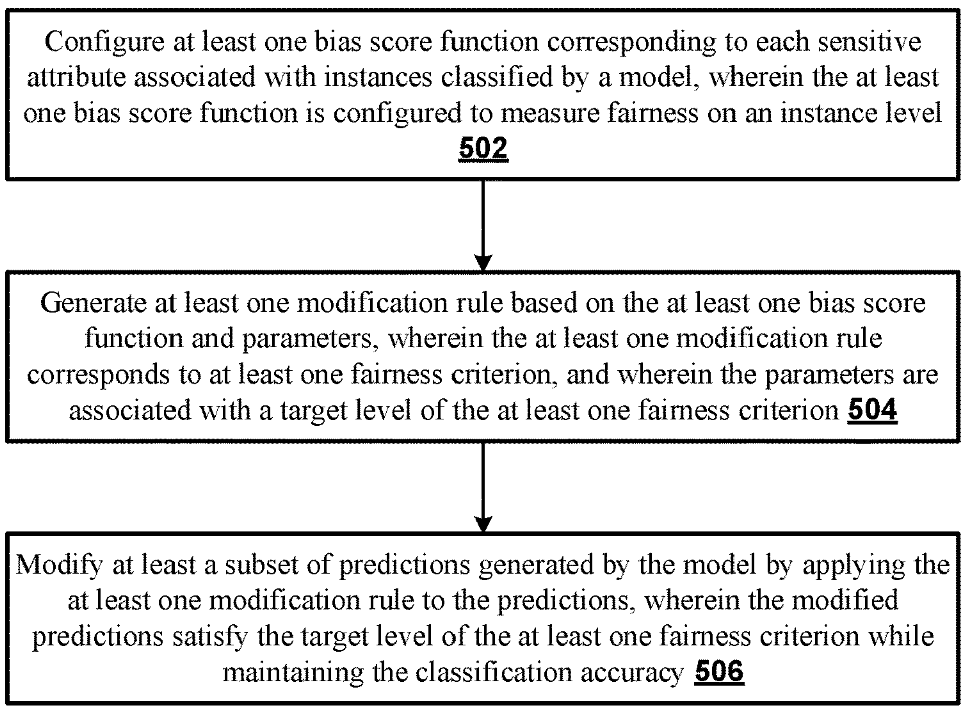
FIG. 5 shows an example process for balancing classification accuracy and fairness of a model trained to perform classification tasks in accordance with the present disclosure.

FIG. 5 illustrates an example process 500 for balancing classification accuracy and fairness of a model trained to perform classification tasks. Although depicted as a sequence of operations in FIG. 5, those of ordinary skill in the art will appreciate that various embodiments may add, remove, reorder, or modify the depicted operations.

At 502, at least one bias score function may be configured. The at least one bias score function may correspond to each sensitive attribute associated with instances classified by a model. The model may be trained to perform classification tasks. The at least one bias score function may be configured to measure fairness on an instance level. For a DP constraint, the at least one bias score may comprise a single bias score of the form shown in Equation 9. For an EOp constraint, the at least one bias score may comprise a single bias score of the form shown above (similar to Equation 9). For an EO constraint, the ground-truth conditional probabilities p(Y, A|X) are needed, and at least one bias score may comprise two bias scores for k=0, 1 with the form shown in Equation 10.

At 504, at least one modification rule may be generated. The at least one modification rule may be generated based on the at least one bias score function and parameters. The at least one modification rule may correspond to at least one fairness criterion (e.g. DP, EOp, or EO). The parameters may be associated with a target level of the at least one fairness criterion.

For a DP constraint, since there is only one bias score, the at least one modification rule may comprise a simple threshold rule of this bias score $\kappa(X)=1\{s(X)/t>1\}$. The threshold t can be positive or negative, depending on which group has the advantage. This allows for linear comparison of fairness on the instance level. That is, departing from a fairness measure defined on a group level, a bias score that measures fairness on each separate instance is derived. For an EOp constraint, the at least one modification rule may also be a simple threshold rule corresponding to the bias score. For an EO constraint, the at least one modification rule may comprise a linear rule in the bias embedding space $(s_o(X), s_1(X))$, which on validation, achieves the targeted equalized odds, while maximizing the accuracy. The problem is no longer a simple threshold choice as in the case of the DP-constrained classifier. A fairness constrained classifier still needs to be fit, only the complexity of the problem has been drastically reduced to dimension K=2, and only a linear classifier has to be fit.

At 506, at least a subset of predictions generated by the model may be modified. The at least a subset of predictions may be modified by applying the at least one modification rule to the predictions generated by the model (e.g., the classifier model 106). The modified predictions may satisfy the target level of the at least one fairness criterion while maintaining the classification accuracy.

Figure 6:
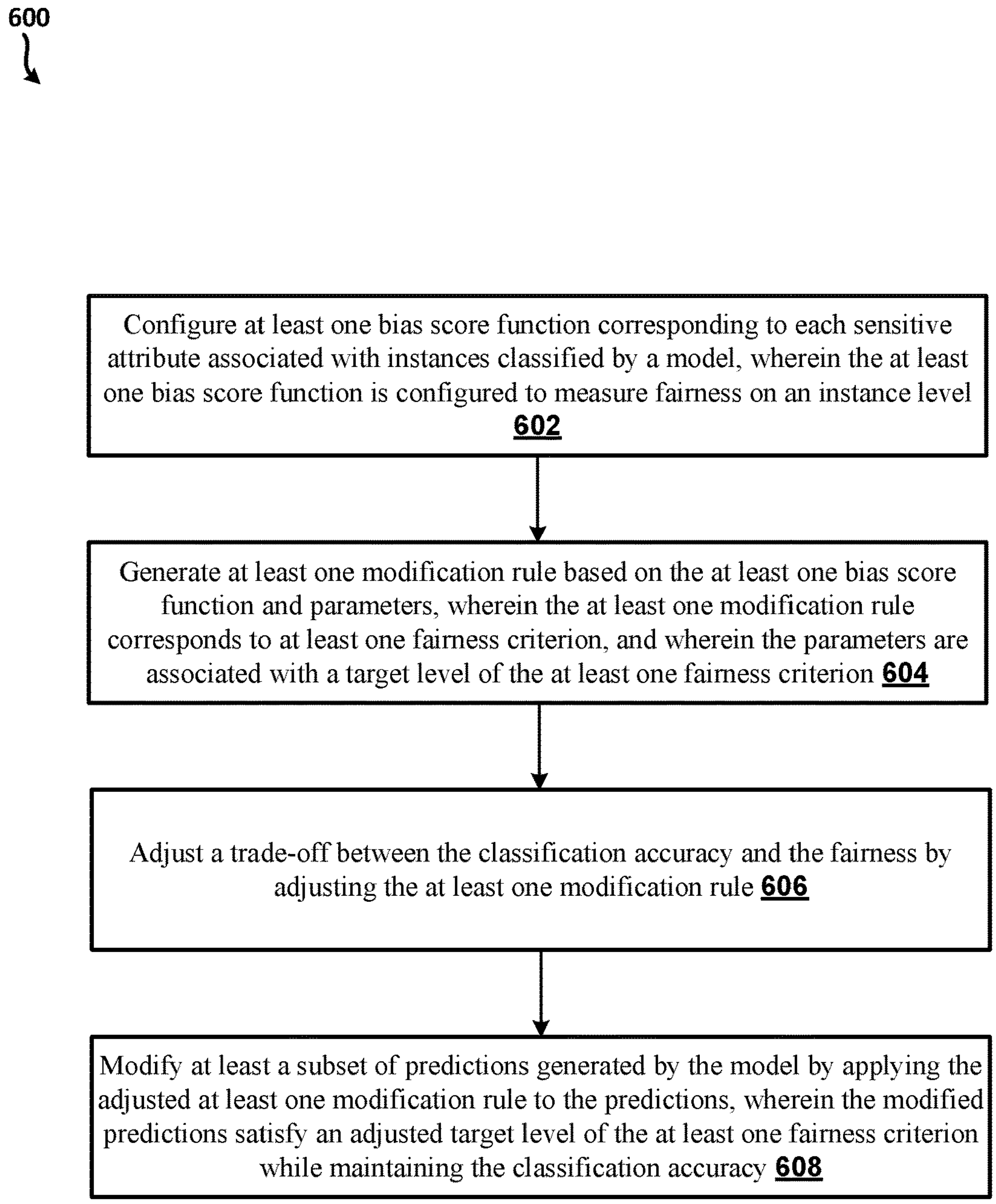
FIG. 6 shows an example process for balancing classification accuracy and fairness of a model trained to perform classification tasks in accordance with the present disclosure.

FIG. 6 illustrates an example process 600 for balancing classification accuracy and fairness of a model trained to perform classification tasks. Although depicted as a sequence of operations in FIG. 6, those of ordinary skill in the art will appreciate that various embodiments may add, remove, reorder, or modify the depicted operations.

At 602, at least one bias score function may be configured. The at least one bias score function may correspond to each sensitive attribute associated with instances classified by a model. The model may be trained to perform classification tasks. The at least one bias score function may be configured to measure fairness on an instance level. For a DP constraint, the at least one bias score may comprise a single bias score of the form shown in Equation 9. For an EOp constraint, the at least one bias score may comprise a single bias score of the form shown above (similar to Equation 9). For an EO constraint, the ground-truth conditional probabilities p(Y, A|X) are needed, and at least one bias score may comprise two bias scores for k=0, 1 with the form shown in Equation 10.

At 604, at least one modification rule may be generated. The at least one modification rule may be generated based on the at least one bias score function and parameters. The at least one modification rule may correspond to at least one fairness criterion (e.g. DP, EOp, or EO). The parameters may be associated with a target level of the at least one fairness criterion.

For a DP constraint, since there is only one bias score, the at least one modification rule may comprise a simple threshold rule of this bias score $\kappa(X)=1\{s(X)/t>1\}$. The threshold t can be positive or negative, depending on which group has the advantage. This allows for linear comparison of fairness on the instance level. That is, departing from a fairness measure defined on a group level, a bias score that measures fairness on each separate instance is derived. For an EOp constraint, the at least one modification rule may also be a simple threshold rule corresponding to the bias score. For an EO constraint, the at least one modification rule may comprise a linear rule in the bias embedding space $(s_o(X), s_1(X))$, which on validation, achieves the targeted equalized odds, while maximizing the accuracy. The problem is no longer a simple threshold choice as in the case of the DP-constrained classifier. A fairness constrained classifier still needs to be fit, only the complexity of the problem has been drastically reduced to dimension K=2, and only a linear classifier has to be fit.

At 606, a trade-off between the classification accuracy and the fairness may be adjusted. The trade-off between the classification accuracy and the fairness may be adjusted by adjusting the at least one modification rule. For example, the trade-off between the classification accuracy and the fairness may be adjusted by adjusting the target (e.g., desired) level of fairness. At 608, at least a subset of predictions generated by the model may be modified. The at least a subset of predictions may be modified by applying the adjusted at least one modification rule to the predictions generated by the model (e.g., the classifier model 106). The modified predictions may satisfy the adjusted target level of the at least one fairness criterion while maintaining the classification accuracy.

Figure 7:
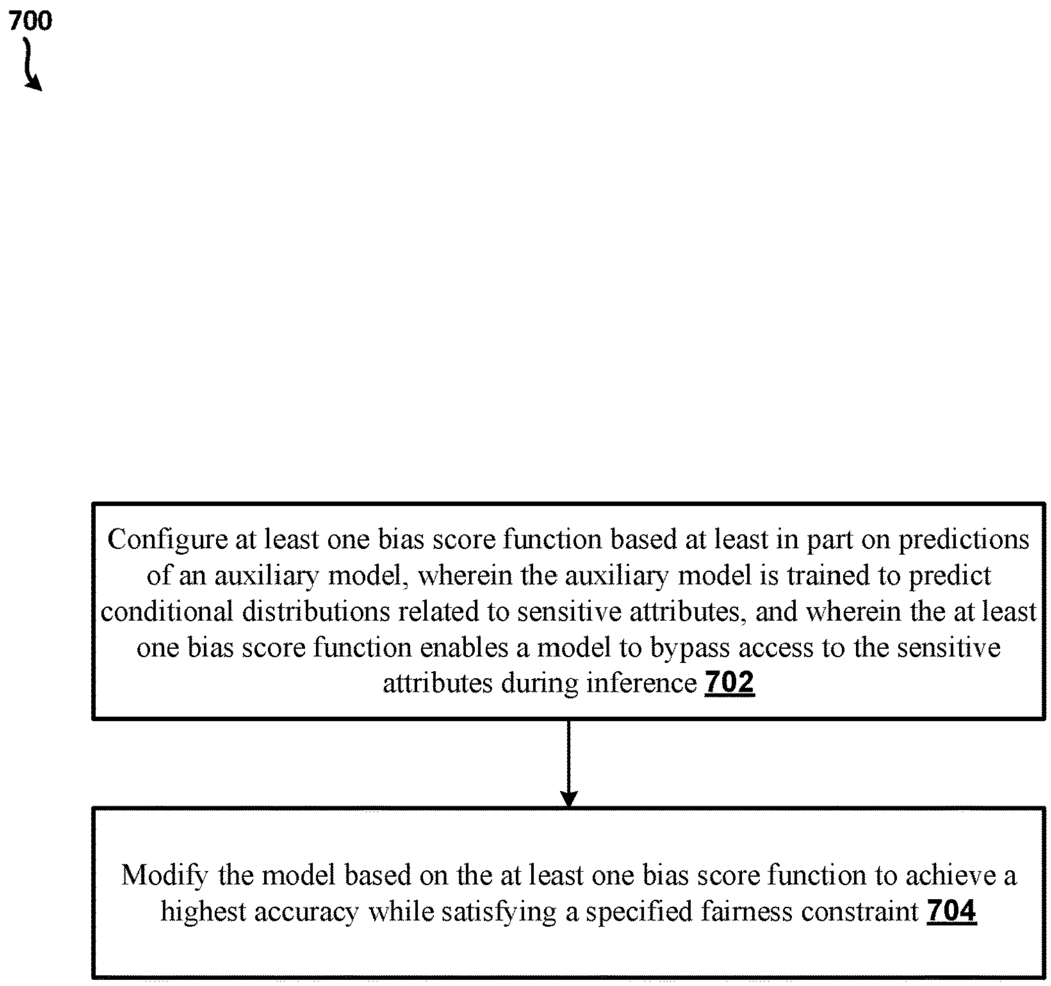
FIG. 7 shows an example process for balancing classification accuracy and fairness of a model trained to perform classification tasks in accordance with the present disclosure.

FIG. 7 illustrates an example process 700 for balancing classification accuracy and fairness of a model trained to perform classification tasks. Although depicted as a sequence of operations in FIG. 7, those of ordinary skill in the art will appreciate that various embodiments may add, remove, reorder, or modify the depicted operations.

At 702, at least one bias score function may be configured. The at least one bias score function may be configured based at least in part on predictions of an auxiliary model (e.g., p̂(A|X) or p̂(Y, A|X)). The auxiliary model may be trained to predict conditional distributions related to sensitive attributes. The at least one bias score function enables a model (e.g., the classifier model 106) to bypass access to the sensitive attributes during inference. The model may be trained to perform classification tasks. The model may be Bayes optimal.

At 704, the model (e.g., the classifier model 106) may be modified. The model may be modified on the at least one bias score function. The model may be modified to achieve a highest accuracy while satisfying a specified fairness constraint. Modifying the model may cause at least a subset of predictions generated by the model to be modified. The at least a subset of predictions may be modified by applying the at least one modification rule to the predictions. The modified predictions may satisfy the target level of the at least one fairness criterion while maintaining the classification accuracy.

Figure 8:
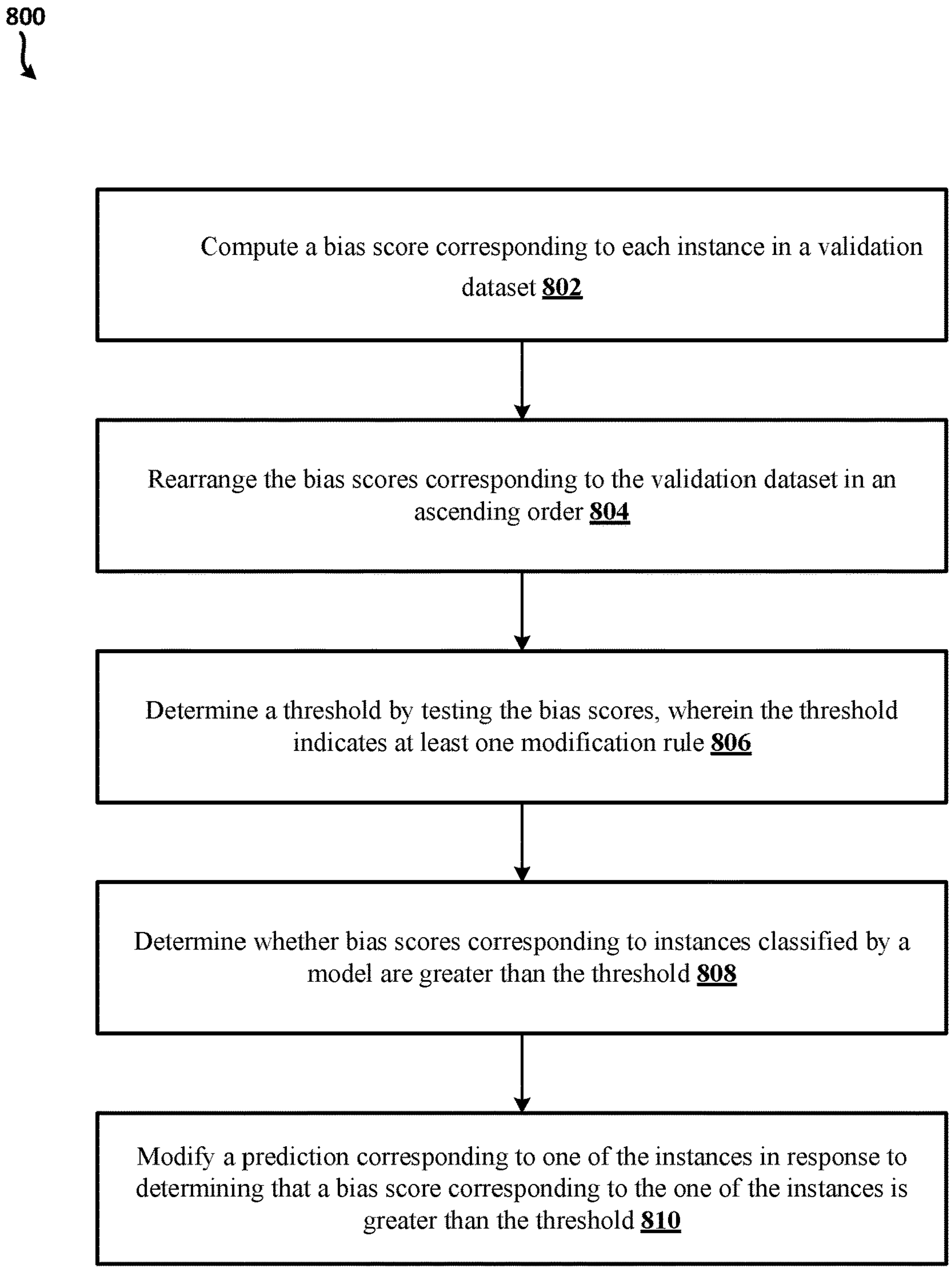
FIG. 8 shows an example process for balancing classification accuracy and fairness of a model trained to perform classification tasks in accordance with the present disclosure.

FIG. 8 illustrates an example process 800 for balancing classification accuracy and fairness of a classifier model using DP or EOp group-fairness metrics. Although depicted as a sequence of operations in FIG. 8, those of ordinary skill in the art will appreciate that various embodiments may add, remove, reorder, or modify the depicted operations.

Two models p̂(Y|X) and p̂(A|X) may be used to estimate a ground truth p(Y|X) and p(A|X) respectively. At 802, a bias score corresponding to each instance in a validation dataset may be computed. The bias score corresponding to each instance may be defined as follows:

$$\hat{s}(X) = \frac{\hat{f}(X)}{\hat{\eta}(X)} = \frac{\{2\hat{Y}-1\}\left[\frac{\hat{p}(A=0\mid X)}{\widehat{\Pr}(A=0)} - \frac{\hat{p}(A=1\mid X)}{\widehat{\Pr}(A=1)}\right]}{2\hat{p}(Y=\hat{Y}(X)\mid X)-1}$$

where $\widehat{Pr}$(A=i) (i=0, 1) can be estimated by computing the ratio of the corresponding group in the training set. At 804, the bias scores corresponding to the validation dataset may be rearranged. The bias scores corresponding to the validation dataset may be rearranged in an ascending order.

At 806, a threshold may be determined. The threshold may be determined by testing bias scores (e.g., using Algorithm 1 as shown in FIG. 2). The threshold indicates at least one modification rule. For example, the modification rule of the form κ(X)=1 {ŝ(X)/t>1} may be searched for, so that the resulting Ŷ t(X)=1 {ŝ(X)/t≤1} Ŷ (X)+1 {ŝ(X)/t>1} (1−Ŷ (X)) satisfies the DP constraint, while maximizing the accuracy. For this, a labeled validation dataset $$(X_i, Y_i, A_i)_{i=1}^{N_{val}}$$

may be used, and a threshold t may be chosen such that the validation accuracy is maximized, while the empirical DP evaluated on it is ≤δ. To find the best threshold value, all $N_{val}$ candidates t=ŝ($X_i$) may be tested, which can be done in O($N_{val}$ log $N_{val}$) time.

At 808, it may be determined whether each bias score corresponding to the instances classified by the model is greater than the threshold. The prediction(s) corresponding to the instance(s) for which the bias score(s) are greater than the threshold may be modified. At 810, a prediction corresponding to one of the instances may be modified. The prediction may be modified in response to determining that a bias score corresponding to the one of the instances is greater than the threshold.

Figure 9:
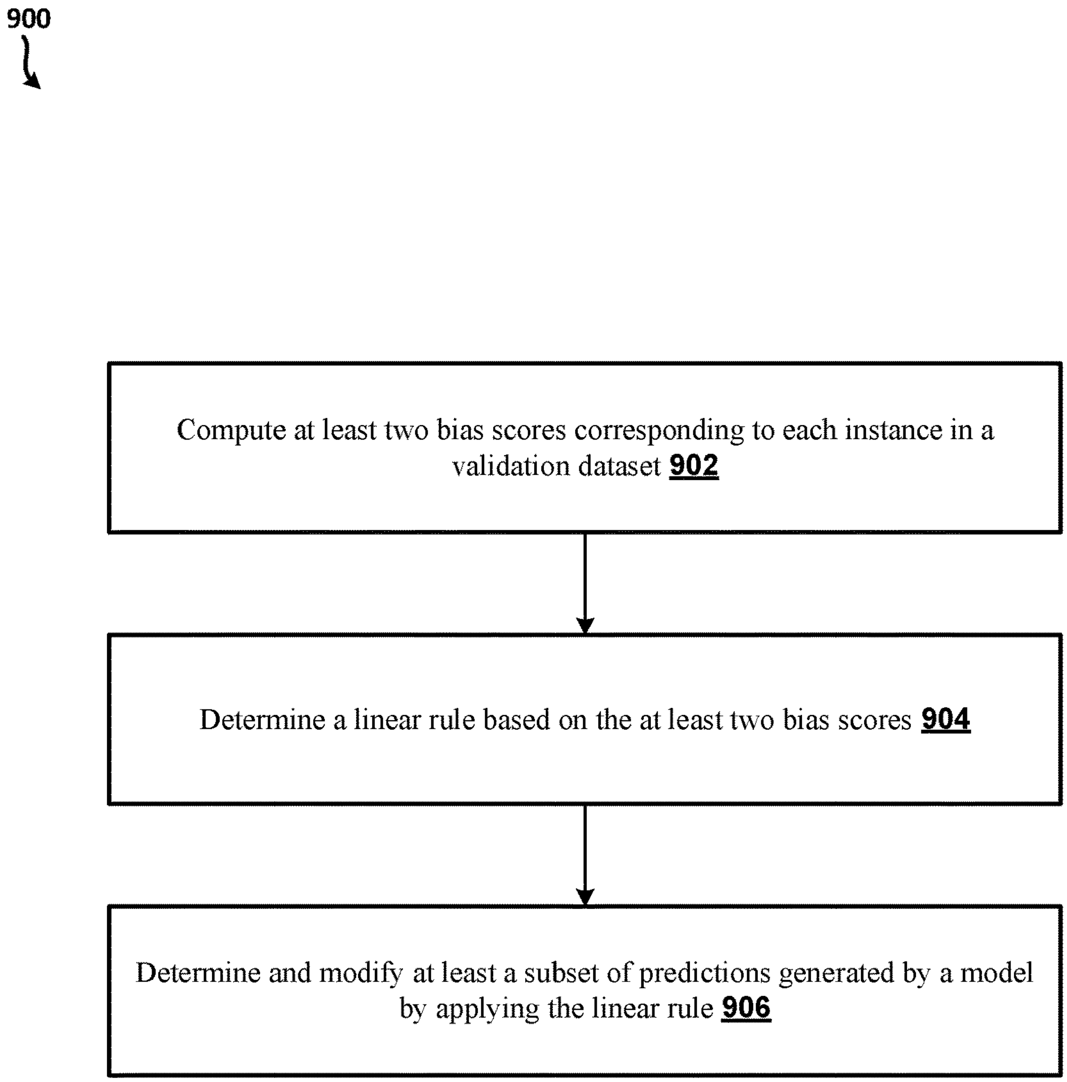
FIG. 9 shows an example process for balancing classification accuracy and fairness of a model trained to perform classification tasks in accordance with the present disclosure.

FIG. 9 illustrates an example process 900 for balancing classification accuracy and fairness of a classifier model using an EO group-fairness metric. Although depicted as a sequence of operations in FIG. 9, those of ordinary skill in the art will appreciate that various embodiments may add, remove, reorder, or modify the depicted operations.

At 902, at least two bias scores corresponding to each instance in a validation dataset may be computed. An auxiliary model p̂(Y, A|X) with four classes may be used to obtain the 2D estimated bias score ($\hat{s}_0$(X), $\hat{s}_1$(X)), where $$\hat{s}_0(X) = \frac{\hat{f}_0(X)}{\hat{\eta}(X)} = \frac{\{2\hat{Y}(X)-1\}\left[\frac{\hat{p}(A=0,\ Y=0\mid X)}{\widehat{\Pr}(A=0,\ Y=0)} - \frac{\hat{p}(A=1,\ Y=0\mid X)}{\widehat{\Pr}(A=1\ Y=0)}\right]}{2\hat{p}(Y=\hat{Y}(X)\mid X)-1}$$

$$\hat{s}_1(X_i) = \frac{\hat{f}_1(X)}{\hat{\eta}(X_i)} = \frac{\{2\hat{Y}(X)-1\}\left[\frac{\hat{p}(A=0,\ Y=1\mid X)}{\widehat{\Pr}(A=0,\ Y=1)} - \frac{\hat{p}(A=1,\ Y=1\mid X)}{\widehat{\Pr}(A=1\ Y=1)}\right]}{2\hat{p}(Y=\hat{Y}(X)\mid X)-1}$$

where each of the $\widehat{Pr}$ (A=a) (Y=y) is again estimated from a training set.

At 904, a linear rule may be determined. The linear rule may be determined based on the at least two bias scores. For example, a linear modification rule κ(X)=1 {a0s ^0(X)+ a1s^1(X)>1} that, for a given validation set, satisfies the empirical EO constraint while maximizing the validation accuracy may be searched for. Two strategies (e.g., Algorithm 2 in FIG. 3 and Algorithm 3 in FIG. 4) may be employed to choose such a linear rule. In the first approach, a subsample of points $$\{(\hat{s}_0(X'_m),\ \hat{s}_1(X'_m))\}_{m=1}^{M}$$

of size M≤$N_{val}$ may be taken and all M(M−1)/2 possible linear rules passing through any two of these points may be considered. For each of these rules, the EO and accuracy on validation set may be evaluated, then maximal accuracy among ones satisfying EO≤δ may be chosen. The total complexity of this procedure is O($M^2N_{val}$). At 810, at least a subset of predictions made by the classifier model may be determined. The determined at least the subset of predictions may be modified. The determined at least the subset of predictions may be modified by applying the linear rule.

The performance of the system 100 was evaluated on real-world binary classification tasks. Two benchmarks were considered. The first benchmark was Adult Census, which is a UCI tabular dataset where the task is to predict whether the annual income of an individual is above $50,000. The dataset was randomly split into a training, validation and test set with 30000, 5000 and 10222 instances respectively. The features were preprocessed to generate a resulting input X (e.g., a 108-dimensional vector). "Gender" was used as the sensitive attribute. The second benchmark was CelebA, which is a facial image dataset containing 200 k instances each with 40 binary attribute annotations. "Attractive", "Big nose", and "Bag Under Eyes" were used as target attributes, and "Male" and "Young" were used as sensitive attributes, yielding 6 tasks in total.

For experiments with DP constraints, two models $\hat{p}(Y|X)$ and $\hat{p}(A|X)$ were trained to predict the target and sensitive attributes respectively, while for experiments with EO constraints, only one model with four classes $\hat{p}(Y, A|X)$ was trained, with each class corresponding to one element in the Cartesian product of target and sensitive attribute.

To evaluate the performance of the system 100, both DP and EO were used as fairness criteria. The modification rules $\kappa(X)$ were selected over the validation set according to the algorithms discussed with regard to FIGS. 2-4. Three levels of constraints were considered for the fairness criteria: $\delta$=10%, 5%, and 1%, and M in Algorithm 2 was set to be 3000, 600 and 5000 for experiments with EO as fairness criterion on Adult Census, COMPAS and CelebA respectively.

Figure 10B:
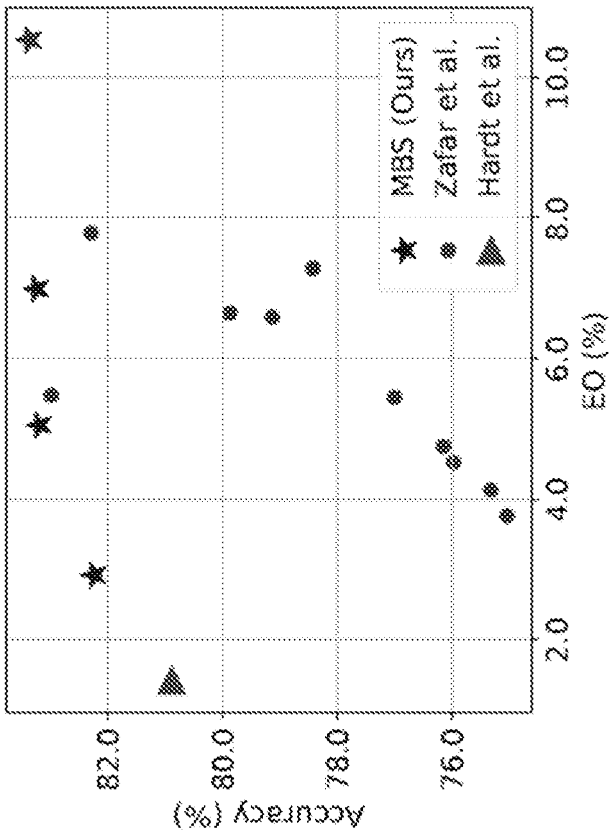
FIG. 10A and FIG. 10B show example evaluation results for experiments with demographic parity (DP) as the fairness criterion in accordance with the present disclosure.
Figure 10A:
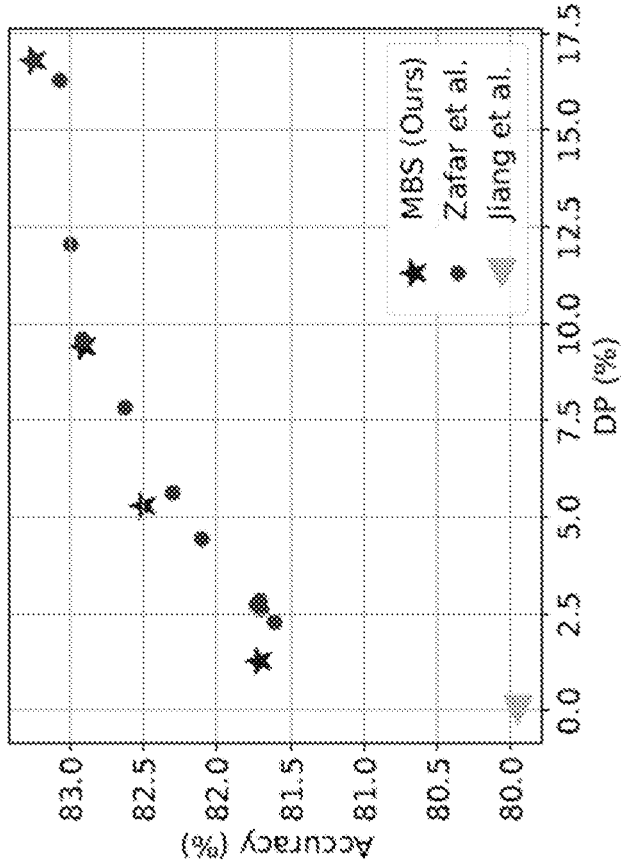

The test set accuracy and the DP/EO computed based on the post-processed test predictions after modification according to $\kappa(X)$ are shown in FIGS. 10A-B. The performance of the system 100 (e.g., MBS) with DP as the fairness criterion on Adult Census dataset was evaluated and compared with existing system (e.g., Zafar and Jiang). The results are reported in the table 1000 of FIG. 10A. As shown in FIG. 10A, the system 100 consistently outperforms Zafar for both datasets in the sense that given different desired levels ($\delta$'s) of DP, the system 100 tends to achieve higher accuracy. Furthermore, while Zafar requires retraining the model each time to achieve a different trade-off between accuracy and DP, the system 100 may be used to flexibly balance between accuracy and DP by simply modifying predictions of a single base model according to different thresholds of the bias score. To evaluate the performance of the system 100 when the fairness criterion is EO, the Adult Census datasets was considered. The result of such evaluation is shown in the table 1002 of FIG. 10B. The observation is similar to that in experiments with DP constraints. The system 100 achieves better trade-off between accuracy and EO than Zafar. Although Hardt can also significantly reduce EO, it is not able to adjust the balance between EO and accuracy and thus is less flexible than the system 100.

In addition, the performance of the system 100 was evaluated on the more challenging dataset, CelebA. The target attributes "Attractive", "Big Nose", "Bag Under Eyes" are denoted as "a", "b" and "e" respectively, and the sensitive attributes "Male" and "Young" are denoted as "m" and "y" respectively. The results are reported in the table 1100 of FIG. 11. As shown in the table 1100, the system 100 tends to achieve better trade-off than Hardt, whose accuracy is severely hurt across all six tasks. The system 100 is able to maintain high accuracy and meanwhile achieve competitive or even smaller EO. Furthermore, the system 100 consistently achieves better or competitive performance when compared with Park, which is one of the state-of-the-art methods for fair learning on CelebA. This verifies the effectiveness of the system 100 for practical fair learning problems.

Figure 12:
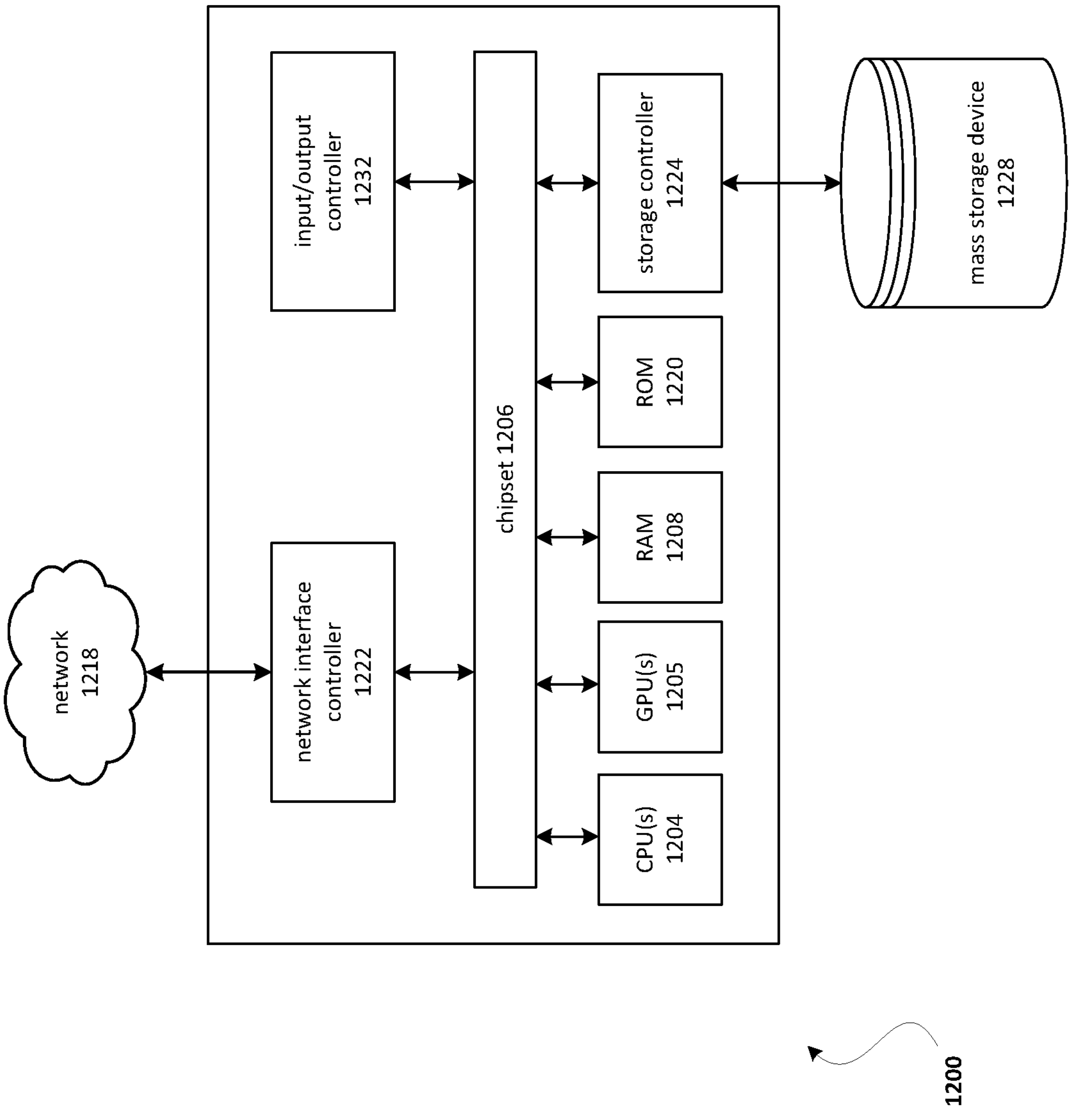
FIG. 12 shows an example computing device which may be used to perform any of the techniques disclosed herein.

FIG. 12 illustrates a computing device that may be used in various aspects, such as the services, networks, submodels, and/or devices depicted in FIG. 1. With regard to FIG. 1, any or all of the components may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claim.

What is claimed is:

1. A method of balancing classification accuracy and fairness of a model trained to perform classification tasks, comprising:

configuring at least one bias score function corresponding to each sensitive attribute associated with instances classified by the model, wherein the at least one bias score function is configured to measure fairness on an instance level;

generating at least one modification rule based on the at least one bias score function and parameters, wherein the at least one modification rule corresponds to at least one fairness criterion, and wherein the parameters are associated with a target level of the at least one fairness criterion; and modifying at least a subset of predictions generated by the model by applying the at least one modification rule to the predictions, wherein the modified predictions satisfy the target level of the at least one fairness criterion while maintaining the classification accuracy.

2. The method of claim 1, further comprising:

adjusting a trade-off between the classification accuracy and the fairness by adjusting the at least one modification rule.

3. The method of claim 1, further comprising:

configuring the at least one bias score function based at least in part on predictions of an auxiliary model, wherein the auxiliary model is trained to predict conditional distributions related to sensitive attributes, and wherein the at least one bias score function enables the model to bypass access to the sensitive attributes during inference.

4. The method of claim 1, wherein the model is Bayes optimal, and wherein the method further comprises:

modifying the model based on the at least one bias score function to achieve a highest accuracy while satisfying a specified fairness constraint.

5. The method of claim 1, wherein the generating the at least one modification rule comprises:

computing a bias score corresponding to each instance in a validation dataset;

rearranging the bias scores corresponding to the validation dataset in an ascending order; and determining a threshold by testing the bias scores, wherein the threshold indicates the at least one modification rule.

6. The method of claim 5, further comprising:

determining whether bias scores corresponding to the instances classified by the model are greater than the threshold; and modifying a prediction corresponding to one of the instances in response to determining that a bias score corresponding to the one of the instances is greater than the threshold.

7. The method of claim 5, wherein the at least one fairness criterion comprises a Demographic Parity (DP) fairness criterion and an Equalized Opportunity (EOp) fairness criterion.

8. The method of claim 1, wherein the generating the at least one modification rule comprises:

computing at least two bias scores corresponding to each instance in a validation dataset; and determining a linear rule based on the at least two bias scores.

9. The method of claim 8, further comprising:

determining and modifying the at least a subset of predictions by applying the linear rule.

10. The method of claim 1, wherein the at least one fairness criterion comprises a composite criterion, and wherein the composite criterion comprises an Equalized Odds (EO) fairness criterion.

11. A system of balancing classification accuracy and fairness of a model trained to perform classification tasks, comprising:

at least one processor; and at least one memory communicatively coupled to the at least one processor and comprising computer-readable instructions that upon execution by the at least one processor cause the at least one processor to perform operations comprising:

configuring at least one bias score function corresponding to each sensitive attribute associated with instances classified by the model, wherein the at least one bias score function is configured to measure fairness on an instance level;

generating at least one modification rule based on the at least one bias score function and parameters, wherein the at least one modification rule corresponds to at least one fairness criterion, and wherein the parameters are associated with a target level of the at least one fairness criterion; and modifying at least a subset of predictions generated by the model by applying the at least one modification rule to the predictions, wherein the modified predictions satisfy the target level of the at least one fairness criterion while maintaining the classification accuracy.

12. The system of claim 11, the operations further comprising:

adjusting a trade-off between the classification accuracy and the fairness by adjusting the at least one modification rule.

13. The system of claim 11, the operations further comprising:

configuring the at least one bias score function based at least in part on predictions of an auxiliary model, wherein the auxiliary model is trained to predict conditional distributions related to sensitive attributes, and wherein the at least one bias score function enables the model to bypass access to the sensitive attributes during inference.

14. The system of claim 11, wherein the model is Bayes optimal, and wherein the method further comprises:

modifying the model based on the at least one bias score function to achieve a highest accuracy while satisfying a specified fairness constraint.

15. The system of claim 11, wherein the generating the at least one modification rule comprises:

computing a bias score corresponding to each instance in a validation dataset;

rearranging the bias scores corresponding to the validation dataset in an ascending order; and determining a threshold by testing the bias scores, wherein the threshold indicates the at least one modification rule.

16. The system of claim 11, wherein the generating the at least one modification rule comprises:

computing at least two bias scores corresponding to each instance in a validation dataset; and determining a linear rule based on the at least two bias scores.

17. A non-transitory computer-readable storage medium, storing computer-readable instructions that upon execution by a processor cause the processor to implement operations comprising:

configuring at least one bias score function corresponding to each sensitive attribute associated with instances classified by the model, wherein the at least one bias score function is configured to measure fairness on an instance level;

generating at least one modification rule based on the at least one bias score function and parameters, wherein the at least one modification rule corresponds to at least one fairness criterion, and wherein the parameters are associated with a target level of the at least one fairness criterion; and modifying at least a subset of predictions generated by the model by applying the at least one modification rule to the predictions, wherein the modified predictions satisfy the target level of the at least one fairness criterion while maintaining the classification accuracy.

18. The non-transitory computer-readable storage medium of claim 17, the operations further comprising:

configuring the at least one bias score function based at least in part on predictions of an auxiliary model, wherein the auxiliary model is trained to predict conditional distributions related to sensitive attributes, and wherein the at least one bias score function enables the model to bypass access to the sensitive attributes during inference.

19. The non-transitory computer-readable storage medium of claim 17, wherein the generating the at least one modification rule comprises:

computing a bias score corresponding to each instance in a validation dataset;

rearranging the bias scores corresponding to the validation dataset in an ascending order; and determining a threshold by testing the bias scores, wherein the threshold indicates the at least one modification rule.

20. The non-transitory computer-readable storage medium of claim 17, wherein the generating the at least one modification rule comprises:

computing at least two bias scores corresponding to each instance in a validation dataset; and determining a linear rule based on the at least two bias scores.

* * * * *